United States Patent [19]

Black

[11] Patent Number: 4,743,332

[45] Date of Patent: May 10, 1988

[54] HOT PLATE WELDING DEVICE FOR BONDING ROOFING MEMBRANES

[76] Inventor: William E. Black, 2509 Manor Oak Dr., Modesto, Calif. 95355

[21] Appl. No.: 941,728

[22] Filed: Dec. 12, 1986

[51] Int. Cl.$^4$ ............................................. B44C 7/00
[52] U.S. Cl. .................................... 156/359; 156/71; 156/497; 156/499; 156/574; 156/577; 156/579
[58] Field of Search ............... 156/71, 359, 497, 499, 156/574, 577, 579, 544

[56] References Cited

U.S. PATENT DOCUMENTS

| | | | |
|---|---|---|---|
| 2,192,290 | 3/1940 | O'Neal | 156/71 |
| 2,709,742 | 5/1955 | Perry | 156/574 |
| 3,189,498 | 6/1965 | Rapp | 156/71 |
| 3,340,125 | 9/1967 | Drenning et al. | 156/499 |
| 4,440,588 | 4/1984 | Stevenson et al. | 156/574 |
| 4,447,288 | 5/1984 | Seaman | 156/497 |
| 4,504,352 | 3/1985 | Meyer | 156/499 |
| 4,533,423 | 8/1985 | Johnson et al. | 156/574 |

FOREIGN PATENT DOCUMENTS

| | | | |
|---|---|---|---|
| 843807 | 8/1960 | United Kingdom | 156/71 |
| 419605 | 3/1974 | U.S.S.R. | 156/574 |
| 473786 | 12/1975 | U.S.S.R. | 156/574 |

*Primary Examiner*—Jerome Massie

[57] ABSTRACT

A hot plate welding device designed specifically to apply asphalt membrane roofing material (hereafter referred to as material) without the use of an open flame. The device uses an electrically heated curved platen which heats the material as it is moved across and in contact with the heated platen. A cylindrical pressure roller applies pressure to the material to insure proper adhesion of the entire surface of the material to the roof structure. A variable speed motor is used as a drive motor for the device. This motor is interlocked with a sensor which senses the temperature of the material. If the material is not at proper temperature the device automatically slows down and waits for the material temperature to catch up to application temperature. The device is designed to have a low center of gravity which allows the device to be used on a roof of mild slope and where the device must fit under pipes and other obstacles commonly encountered when applying such roofing materials. The feed mechanism consists of two rollers one of which pivots such that they allow the material to be fed easily onto the heating platen from the surface of the roof while reducing the amount of friction caused by the device forcing itself between the roof and material. A steering mechanism allows the operator to guide the device and keep it in alignment with material.

8 Claims, 3 Drawing Sheets

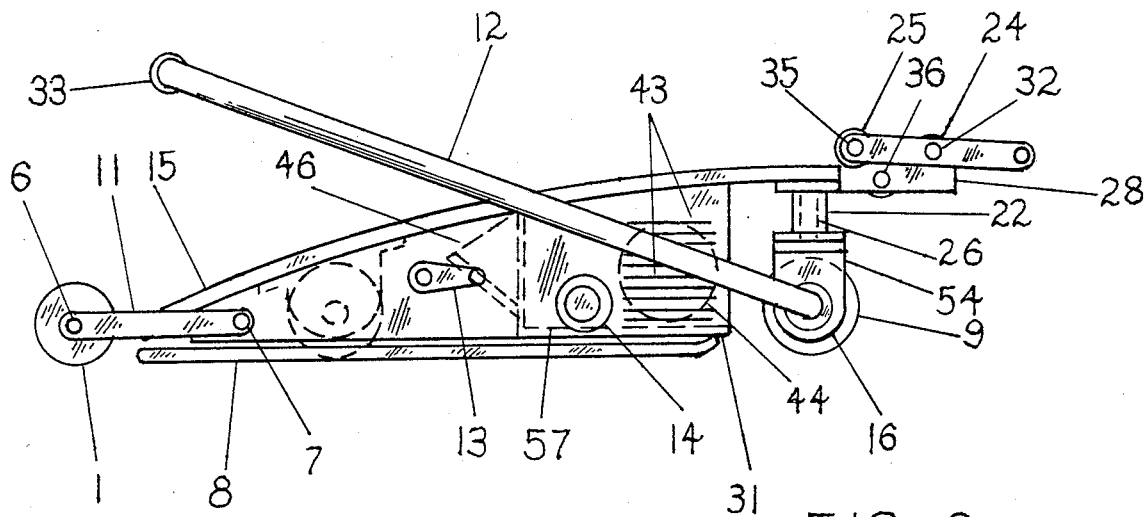
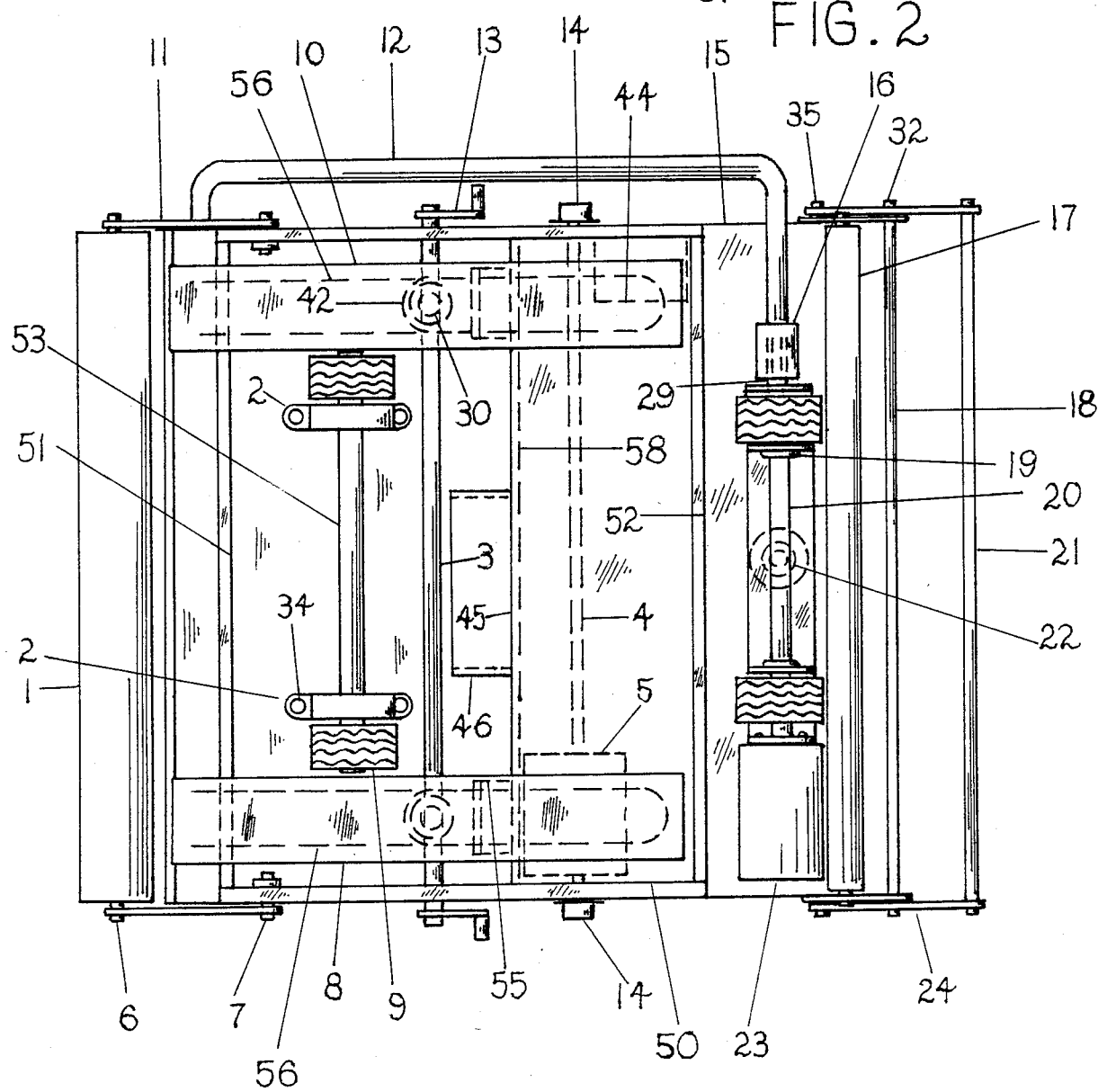

HOT PLATE WELDING DEVICE FOR BONDING ROOFING MEMBRANES

DISCUSSION OF PRIOR ART

This device relates to the field of applying heat weldable asphalt membrane material (hereafter referred to as material) to roof surfaces. The above mentioned material comes in rolls of various widths the largest of which is 39 inches. Each roll has a length of approximately 33 feet. Heretofore the common method for applying this type of material to the roof is to slowly roll the material out onto the roof while applying heat to the surface of the the material before it comes in contact with the roof by means of an industrial grade propane gas torch. The surface of the material is heated to melting temperature. The material is then put into contact with a roofing paper layer which is mechanically attached to the roof surface prior to the application of the material. When the melted material surface is put into contact with the roofing paper surface it forms a permanent watertight bond. This bond also gives the material a superior mechanical strength because as previously mentioned the roofing paper is mechanically attached to the roof structure.

This requirement that the entire surface of the material must be heated to melting temperature has brought about major problems which plague the industry. The amount of heat required to bring the entire surface of the material to the melting temperature is very large. This is why the industry has used a propane gas torch. The torch delivers a large quantity of energy for a low cost. The problem with the propane gas torch is that it is extremely dangerous when not used properly. There are many documented cases involving loss of life and property as a result of the misuse of propane gas torches. This has resulted in very large increases in liability insurance premiums. These increased insurance premiums have caused many roofing contractors to either drop their insurance or get out of the roofing business altogether.

During my search of prior art some devices related to the roofing industry have come to my attention. All of the devices I found have been designed to heat and seal only small sections of material and not the total surface area of the material. These devices primarily focus on the overlapping seam area between two pieces of heat weldable material. This seam area is a very small portion of the total surface area of the material, usually about 10%. Contained in the patent by Meyer U.S. Pat. No. 4,504,352 for instance is a device which performs such a task by using an electrically heated platen with which to heat the seam area by means of conduction. In still another patent Stevenson U.S. Pat. No. 4,440,588 the seam area is welded by using the principle of convection by which air is first heated and then blown into the seam area of the material. In my search I found no device which could be readily adapted to heat the entire surface of a roll of material without total redesign. The problems encountered when heating the total surface area of a roll of material are much more complex than when heating just a seam.

Accordingly several objects of my invention are to provide a device that toally eliminates the use of the propane gas torch in the application of asphalt membrane roofing material. This device offers the roofing contractor an economical alternative for applying asphalt membrane roofing material without the use of an open flame on the roof. Further objects and advantages of my invention will become apparent from a consideration of the drawings and ensuing description thereof.

DESCRIPTION OF DRAWINGS

FIG. 1, is a profile view of the hot plate welder.

FIG. 2, is a bottom view of the hot plate welder.

DESCRIPTION OF THE PREFERRED EMBODIMENT

Figure 3:
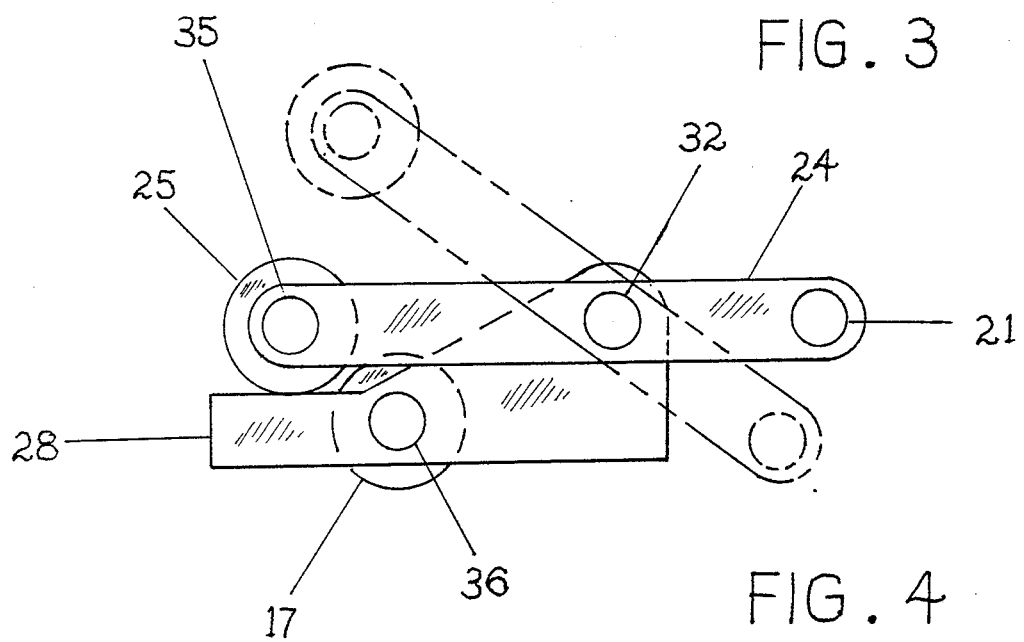
FIG. 3, is a profile view of the material feed roller assembly with phantom lines showing the operation of the assembly.

As generally indicated in FIGS. 1 through 6, an asphalt membrane welding device according to the presently preffered embodiment of the present invention is shown as comprising a heating platen 15, attached by mounting means on top of five insulated side walls 31, (FIG. 1) 50,51,52,58, (FIG. 2).

A drive wheel assembly (FIG. 5) consisting of two wheels 9, axle bearings 19, axle 20, mounting bracket 54, drive motor 23, and handle assembly 12,29, and 16, are mounted to steering housing 22, with pivoting shaft 26, extending into the pressed bronze bearing 48, and retained by mounting means 47. Steering housing 22, is attached by mounting means to the front center area of heating platen 15 (FIG. 2).

The rear wheel assembly in FIG. 2, consists of two wheels 9, joined by axle 53, mounted onto two pillow block bearings 2. The whole assembly is attached to the heater platen 15 in four places by mounting means 34.

The feed roller shaft 35, (FIG. 3) extends through the feed roller 25, and is attached on both ends to the two fulcrum bars 24. Two pivot shafts 32, are used as mounting means to attach the fulcrum bars 24, to the two feed roller assembly brackets 28. The anti-friction shaft 36, extends through the anti-friction roller 17, and is attached by mounting means at both ends to the feed roller assembly bracket 28. Material feed handle 21, is attached by mounting means at both ends to the two fulcrum bars 24. The feed roller assembly brackets 28, are used to attach the entire assembly by mounting means to the front end of heater platen 15.

The pressure roller shaft 6, (FIGS. 1 and 2) extends thru the pressure roller 1, and is attached on both ends by mounting means to the two pivot arms 11. The pivot arms 11, are attached by mounting means 7, on one side to insulated wall 50, and on the other side to insulated wall 31 (FIG. 1).

Figure 4:
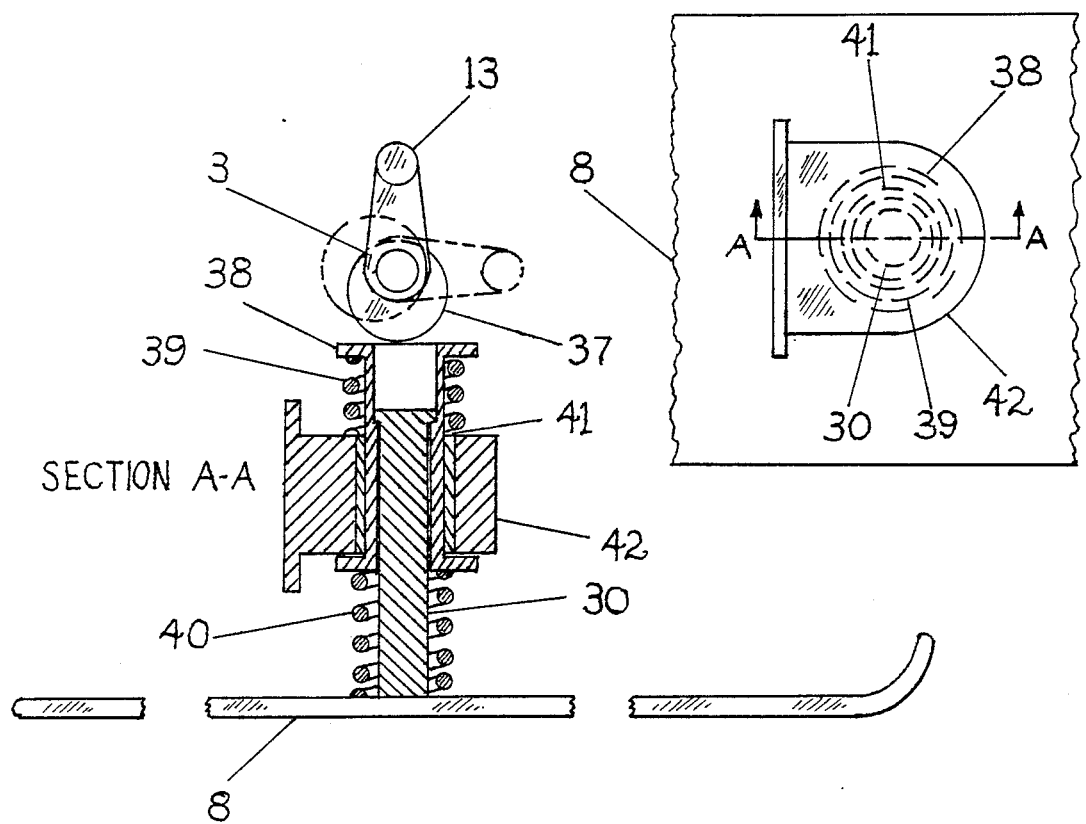
FIG. 4, is a section view showing the operation of the seam heater selector assembly which includes the section view AA.

The heater platen 15, (FIG. 6) has a resistance type metal sheathed electric heating element 49 embedded within itself. The seam heaters 8, (FIG. 2) have heating elements 56 embedded within them and are attached by mounting means to the sliding shaft 30, (FIG. 4).

The seam heater selector assembly (FIG. 4) consists of sliding shaft 30, mounted into the shaft housing 38. The seam heater Selector assembly is held in position by bronze bearing 41, which is pressed into the selector housing 42. A cylinderical Compression spring 39 is mounted in position between the top shoulder of shaft housing 38 and selector housing 42. Cylindrical compression spring 40 is mounted in position between the bottom shoulder of shaft housing 38 and seam heater 8. The entire seam heater selector housing is attached to the insulated wall 58, (FIG. 2) in two places with mounting block 55.

The seam selector handle 13, (FIGS. 1 and 2) is attached by mounting means to cam shaft 3. The cam lobes 37, are attached by mounting means to cam shaft 3, in position such that they are 120 degrees offset from each other. The cam shaft 3, (FIG. 2) is supported by insulated walls 50, and 31, (FIG. 1) and is positioned such that the two cam lobes 37 are directly over each of the two shaft housings 38.

The temperature and motor controls 5, (FIG. 2) are mounted in an area which is enclosed by insulated walls 58,52,50 (FIG. 2) 57,31, (FIG. 1) and the front portion of heater platen 15. Two speed control knobs 14, are attached by mounting means to control shaft 4, (FIG. 2). Control shaft 4, extends through insulated walls 50, and 31 (FIG. 1), where it is positioned for access from either side of the device.

A boxer fan 44, (FIG. 2) is attached by mounting means to insulated wall 31 (FIG. 1) and positioned directly against air louvers 43. An air deflection housing 46 is attached by mounting means to insulated wall 58 in a position which surrounds air louvers 45 on three sides. A material temperature sensor (not shown) consisting of a Thermocouple mounted in an insulated housing is attached by mounting means and positioned so that it will sense the material temperature at the point just prior to being applied to the roof.

DESCRIPTION OF OPERATION

After a suitable asphalt impregnated fiberglass sheet has been applied and mechanically fastened to the roof the operator turns on the hot plate welding device (hereafter called the device). The device begins a heat up cycle. The asphalt membrane roofing material (hereafter referred to as the material) is unrolled and laid flat on the roof in front of the device.

The operator positions the device at the beginning of the roll of material. when the device is in position at the start of the roll the operator then lifts the end of the roll and begins to feed the roll of material onto the heater platen by lifting the feed roller 25, (FIG. 3) which lifts to the open position (shown by the phantom lines of FIG. 3) and inserts the material between the feed roller 25, and the anti-friction roller 17. The anti-friction roller 17, will allow the device to push itself between the material and the roof while relieving friction caused by this action. The feed roller 25, holds the material down against the heater platen surface 15. The operator then positions the material on the heater platen 15, and threads the material under the pressure roller 1. The material 59, (FIG. 6) applied in such a way that it overlaps any previously applied roll of material 60, by approximately six inches.

Figure 6:
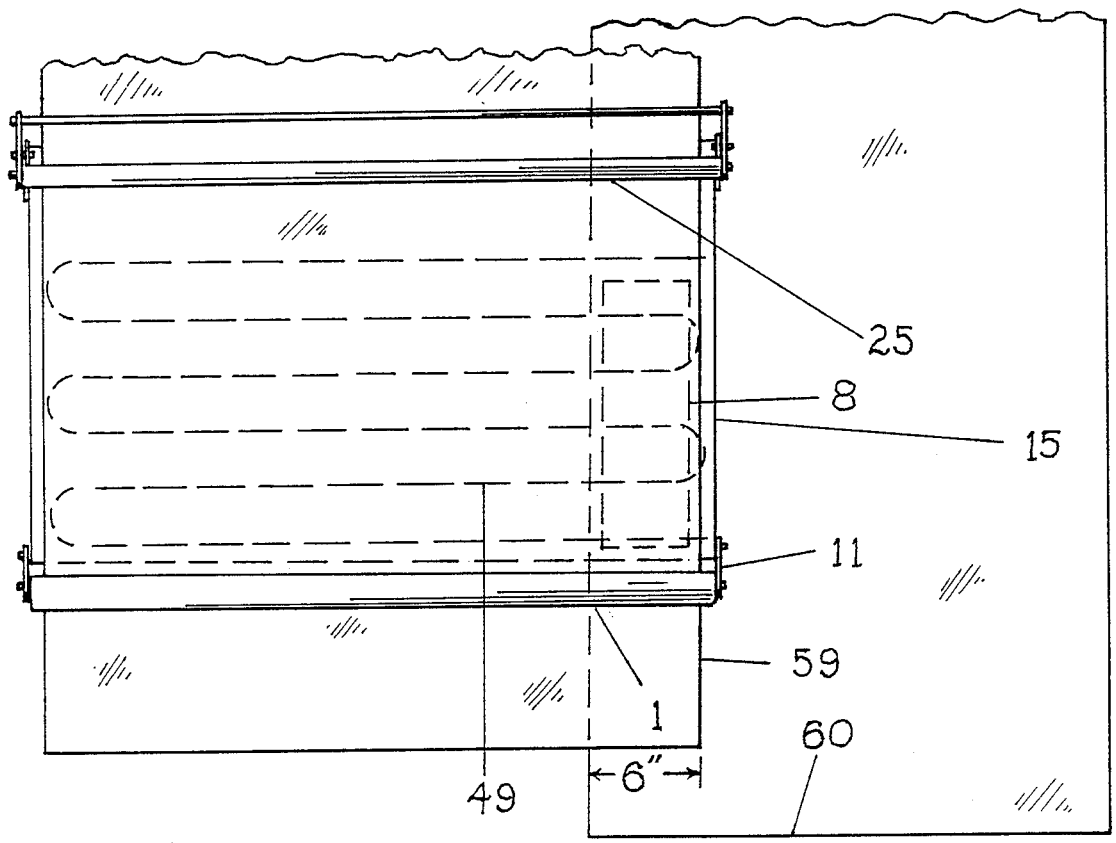
FIG. 6, is a top view of the hot plate welding device with material feed roller assembly and material applicator roller attached showing the alignment relationship of the two rolls of material to the heater platen and seam heater.

The operator selects either left or right hand seam heater operation by use of the selector handle 13, which when rotated has three positions. Position one causes the cam lobe 37, for the right seam heater 8, to depress the shaft housing 38, for the right seam heater 8, forcing the right seam heater 8, to drop down and ride on the six inch exposed surface of the previously applied roll of material 60, (FIG. 6). When in this position the compression springs 39, and 40, (FIG. 4) are both compressed. Compression spring 40, holds pressure against the seam heater 8, while allowing the seam heater 8, to ride over uneven surfaces. The left seam heater is in the raised condition when selector handle 13, is at position one. When in the raised condition the cam lobe 37, for the left seam heater 8, is moved away from contact with shaft housing 38, for left seam heater 8. In this condition compression springs 39, and 40, are both in the extended condition. Compression spring 39, is strong enough to hold the entire seam heater assembly (FIG. 4) in the raised condition. Position two of selector handle 13, is the exact inverse operation or position one. The left seam heater 8, drops down while the right seam heater 8, is raised. At position three of the selector handle 13, both the left and right seam heaters 8, are in the raised condition. In order to better understand the operation of the seam heater selector assembly (FIG. 4) it is important to keep in mind that sliding shaft 30, slides up and down within shaft housing 38, and shaft housing 38, slides up and down within bronze bearing 41.

When the device reaches a preset operating temperature (set by manufacturer), and the device and material are positioned, a material application speed is then set by the operator by adjusting speed control knob 14. When this speed is set the device begins to move at what is described as the catch up speed. This speed is preset by the manufacturer and is in force until the themocouple senses that the material itself is at operating temperature. The device simultaneously begins to heat both the material being applied, 59, (FIG. 6) and the seam of the material already applied 60. The material being applied will overlap the material already applied by a minimum of six inches. The entire bottom surface area of the material being applied 59, is heated by the heater platen 15. The top surface seam area of the material already applied 60, is heated by the seam heater 8, selected by the operator. When the thermocouple senses that the material is at the proper temperature it allows the operators speed control setting to be in command. As the material comes off the back of the heater platen 15, the pressure roller 1, rolls across the top surface of the material and presses the material down against the roof assuring good adhesion to the asphalt impregnated fiberglass sheet as well as pressing together the overlapping seam joint area between the material already applied 60, and the material being applied 59. If at any time during the run cycle the thermocouple should sense that the material being applied is not at application temperature the device automatically switches to the catch up mode and slows down to wait for the material to reach the proper temperature.

Figure 5:
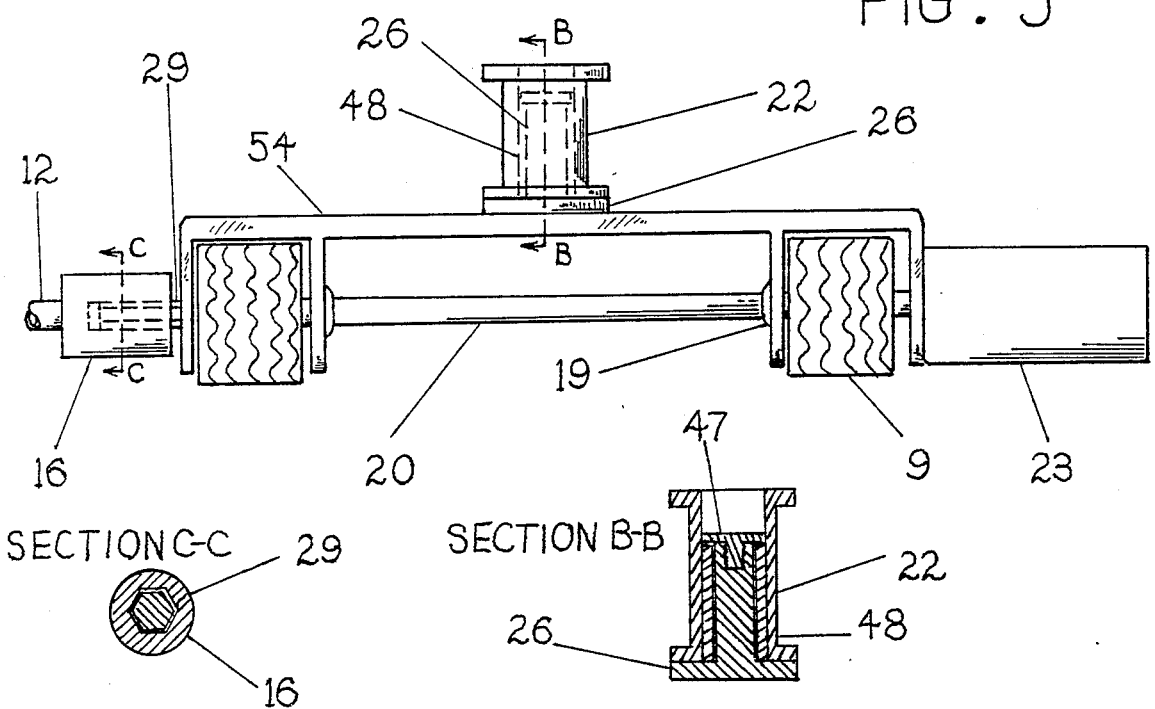
FIG. 5, is a front view of the drive wheel assembly which includes two section views BB, and CC. Section view BB shows the steering means pivot point area. Section CC shows how the steering handle can be rotated to different positions.

The operator may guide the machines direction by use of the handle 12. When the device is moving the operator is able to steer the device by holding handle grip 33 and moving the handle 12, left or right as needed. By moving the handle 12, left or right the drive wheel assembly (FIG. 5) turns by means of the pivoting shaft 26, being made to pivot within steering housing 22. The turning action is made smoother by the use of bronze bearing 48. The operator may operate the machine from the front or rear by means of the handle assembly 12,29, and 16, shown in section CC (FIG. 5). The handle assembly works in the same manner as a socket tool does. The female end 16, which is permanently attached by mounting means to handle 12, is removable from the male piece 29, which is permanently attached to mounting bracket 54. The hexagon shape of these two mating pieces 16, and 29, allows at least four separate handle positions to be selected at any time during operation.

The boxer fan 44, sucks air into the controls area surrounded by insulated walls 57,58,52,50,31, and heater platen 15, (FIGS. 1 and 2) through air louvers 43. This air cools the controls and then exits through air louvers 45. Once this air exits through air louvers 45, the air is then directed by the air deflection housing 46, towards the bottom side of heater platen 15, where the air is warmed. The warm air circulates within the area bordered on four sides by insulated walls 50,51,31,58. This area acts as a roof pre-heat zone just prior to application of the material.

While the above description contains may specificities, these should not be construed as limitations on the scope of the invention, but rather as an exemplification of one preferred embodiment thereof. Many other variations are possible, for example, a combination of infrared or radiant and conduction heat sources can be used in place of the heater platen 15, to heat the entire surface of the material. The way this would work is to use the conduction heat as a pre-heat and the infra-red or radiant heat as the means to bring the material into the liquid phase just prior to application. Radiant heat can also be used as the sole source of heat in place of the heater platen if totally non-contact heating of the material is desirable. The roll of material could be mounted on the device and applied as it is heated rather than being rolled out onto the roof first. A series of rollers could be used in place of the pressure roller 1, or the pressure roller 1, could be used as the drive wheel for the device as well as a pressure roller. Accordingly, the scope of the invention should be determined not by the embodiment illustrated, but by the appended claims and their legal equivalents.

What is claimed is:

1. A hot plate welding device for applying partially overlapping asphalt membrane type heat sealable roofing material completely without the use of any type of open flame for any portion of the application process comprising:
    (a) a frame having a front and rear portion thereof;
    (b) a portability means for moving said frame along the length of a roll of roofing material rolled out onto a roof surface said frame having the ability to move between said rolled out roll of roofing material and said roof surface while said frame is moved therealong;
    (c) a means for reducing the amount of friction incurred from the frame moving along forcing itself between material and the roof surface such friction being reduced sufficiently to eliminate any pleating or distortion of the materials original shape;
    (d) a means for heating the entire underlying surface of said rolled out roll of roofing material while said frame moves therealong, said heating being sufficient enough to cause a watertight seal when the roofing material is brought into contact with the roofs surface;
    (e) a means for heating that seam portion of a previously applied roll of roofing material, that when the heated surface of said rolled out roll of roofing material is applied would overlap and come in contact with said seam portion of the previously applied roofing material said heating being sufficient to create a watertight seal at the point where the two rolls of material overlap;
    (f) a means to press the entire surface of said rolled out roll of roofing material down against the roof surface after the said material has been heated the pressure being sufficient enough to aid in sealing said rolled out roofing material to the roof surface even though the roof surface may not be entirely flat;
    (g) a means to control speed according to material application temperature such that if the temperature is not sufficient to apply said rolled out roll of roofing material properly the speed of the frame would be slowed down in such a manner as to wait for the material to rise to the proper application temperature;
    (h) a steering means that allows the frame to be guided by an operator to insure proper alignment of the frame to the rolled out roll of roofing material;
    (i) a means to pre-heat the roof surface where the rolled out roll of roofing material is to be applied just prior to the application of said rolled out roll of roofing material, said means comprising a compartment between the heater platen and roof surface enclosed on four sides by an insulating means and a air handling device which directs air into said compartment area against the bottom side of the heater platen, the air thereby becoming heated by said platen which in turn heats the compartment volumetric area and results in heating the roof surface by means of convection as the seam heater platen applies heat to the seam of the adjacent roll of asphalt material, said preheating being sufficient enough to eliminate the possibility that the roof surface might act to cool the roof material being applied and ruin the watertight seal that would normally result.

2. The hot plate welding device in claim 1, where said frame is a skeletal structure composed of a plurality of steel bars whereto a plurality of insulated sheet metal walls are attached.

3. The hot plate welding device in claim 1, where said portability means consists of four rotatable wheels two in the front of the frame and two in the back of the frame, the two in the front being coupled to a variable speed motor.

4. A hot plate welding device in claim 1, where said means for reducing friction comprises a rotatable roller with which the material makes contact but is not allowed to drag across because of the rolling action that occurs when the roller is contacted by the material.

5. A hot plate welding device in claim 1, where said heating means for the entire underlying surface of the rolled out roll of roofing material comprises a heater platen with a electric heating element cast into itself the heater platen having a minimum width equal to the width of the rolled out roll of roofing material, said heater platen being made of material with suitable heat conduction properties.

6. A hot plate welding device in claim 1, where said heating means for the seam area of the previously applied roll of material comprises an electric heating element cast into a platen with suitable heat conduction properties said platen having a minumum width equal to the width of the overlapping seam area where the two rolls of roofing material contact each other.

7. A hot plate welding device in claim 1, where said means to press the material against the roof surface comprises a rotatable pressure roller mounted on the back end of the hot plate welding device and riding across the top surface of the roofing material just put into contact with the roofs surface pressing the roll of material being applied down firmly to the roof surface to aid in creating a water tight seal.

8. A hot plate welding device in claim 1, where said means to control speed according to material application temperature comprises a solid state electronic temperature controller that has the application temperature pre-set by the manufacturer with an output suitable to drive a variable speed motor.

* * * * *